US008784238B2

(12) United States Patent
Rajagopalan et al.

(10) Patent No.: US 8,784,238 B2
(45) Date of Patent: Jul. 22, 2014

(54) HIGHLY NEUTRALIZED POLYMERIC COMPOSITIONS FOR GOLF BALL LAYERS

(75) Inventors: Murali Rajagopalan, Fairhaven, MA (US); Michael J. Sullivan, Fairhaven, MA (US); Pamela V. Arnold, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 30 days.

(21) Appl. No.: 12/123,949

(22) Filed: May 20, 2008

(65) Prior Publication Data

US 2008/0312007 A1  Dec. 18, 2008

Related U.S. Application Data

(63) Continuation-in-part of application No. 11/135,450, filed on May 24, 2005, and a continuation-in-part of application No. 11/135,288, filed on May 24, 2005, now Pat. No. 7,744,494.

(51) Int. Cl.
*A63B 37/06* (2006.01)

(52) U.S. Cl.
USPC .......................................... 473/377; 473/373

(58) Field of Classification Search
USPC .......................................... 473/373, 374, 377
See application file for complete search history.

(56) References Cited

U.S. PATENT DOCUMENTS

| 3,262,272 | A | 7/1966 | Barakauskas et al. ....... 60/39.05 |
| 4,431,193 | A | 2/1984 | Nesbitt ..................... 273/235 R |
| 4,560,168 | A | 12/1985 | Aoyama ........................ 273/232 |
| 4,884,814 | A | 12/1989 | Sullivan .................... 273/235 R |
| 4,911,451 | A | 3/1990 | Sullivan et al. ............ 273/235 R |
| 4,960,281 | A | 10/1990 | Aoyama ........................ 273/232 |
| 5,334,673 | A | 8/1994 | Wu ............................ 273/235 R |
| 5,484,870 | A | 1/1996 | Wu ................................. 528/28 |
| 5,688,191 | A | 11/1997 | Cavallaro et al. ............ 473/373 |
| 5,692,974 | A | 12/1997 | Wu et al. ...................... 473/377 |
| 5,713,801 | A | 2/1998 | Aoyama ....................... 473/354 |
| 5,803,831 | A | 9/1998 | Sullivan et al. ............... 473/374 |
| 5,849,168 | A | 12/1998 | Lutz ............................. 264/755 |
| 5,885,172 | A | 3/1999 | Hebert et al. ................. 473/354 |
| 5,908,358 | A | 6/1999 | Wu ............................... 473/378 |
| 5,919,100 | A | 7/1999 | Boehm et al. ................ 473/354 |
| 5,965,669 | A | 10/1999 | Cavallaro et al. ............ 525/221 |
| 5,981,654 | A | 11/1999 | Rajagopalan .................. 525/66 |
| 5,981,658 | A | 11/1999 | Rajagopalan et al. .......... 525/72 |
| 5,994,472 | A | 11/1999 | Egashira et al. .............. 525/221 |
| 6,015,356 | A | 1/2000 | Sullivan et al. ............... 473/373 |
| 6,056,842 | A | 5/2000 | Dalton et al. ................. 156/243 |
| 6,149,535 | A | 11/2000 | Bissonnette et al. .......... 473/354 |
| 6,180,040 | B1 | 1/2001 | Ladd et al. .................... 264/248 |
| 6,180,722 | B1 | 1/2001 | Dalton et al. ................. 525/193 |
| 6,207,784 | B1 | 3/2001 | Rajagopalan .................. 528/71 |

(Continued)

OTHER PUBLICATIONS

Non-Final Office Action dated Apr. 27, 2010 of corresponding U.S. Appl. No. 11/135,450.

(Continued)

*Primary Examiner* — Raeann Gorden
(74) *Attorney, Agent, or Firm* — Smith, Gambrell & Russell, LLP

(57) ABSTRACT

Compositions for golf balls including modified highly neutralized polymeric compositions that have improved processability including improved melt flow index and improved performance characteristics when included in a layer of a golf ball. In addition, the compositions of the invention have less moisture transmission and higher flexural modulus than non-modified highly neutralized polymers.

21 Claims, 2 Drawing Sheets

(56) References Cited

U.S. PATENT DOCUMENTS

| | | | |
|---|---|---|---|
| 6,277,035 B1 | 8/2001 | Sullivan et al. | 473/374 |
| 6,386,992 B1 | 5/2002 | Harris et al. | 473/371 |
| 6,503,156 B1 | 1/2003 | Sullivan | 473/374 |
| 6,506,130 B2 | 1/2003 | Sullivan | 473/374 |
| 6,562,906 B2 | 5/2003 | Chen | 525/191 |
| 6,632,147 B2 | 10/2003 | Cavallaro et al. | 473/374 |
| 6,762,246 B2 | 7/2004 | Chen | 525/194 |
| 6,835,794 B2 | 12/2004 | Wu et al. | 528/64 |
| 7,160,954 B2 | 1/2007 | Zieske et al. | 525/329.9 |
| 7,217,764 B2 | 5/2007 | Wu et al. | 525/92 C |
| 2001/0009310 A1 | 7/2001 | Hebert et al. | |
| 2001/0018375 A1 | 8/2001 | Hayashi et al. | |
| 2001/0019971 A1 | 9/2001 | Hayashi et al. | |
| 2002/0025862 A1 | 2/2002 | Sullivan et al. | |
| 2002/0028885 A1 | 3/2002 | Sullivan et al. | |
| 2003/0078348 A1 | 4/2003 | Rajagopalan et al. | |
| 2003/0225197 A1 | 12/2003 | Rajagopalan et al. | |
| 2004/0132552 A1 | 7/2004 | Chen | |
| 2004/0229995 A1 | 11/2004 | Wu | |
| 2004/0262808 A1 | 12/2004 | Wu | |
| 2004/0266971 A1 | 12/2004 | Wu | |
| 2006/0094539 A1* | 5/2006 | Sullivan et al. | 473/371 |
| 2006/0105858 A1* | 5/2006 | Kennedy et al. | 473/371 |

OTHER PUBLICATIONS

U.S. Appl. No. 10/875,725, filed Jun. 25, 2004 entitled "Golf Ball Compositions Neutralized with Ammonium-Based and Amine-Based Compounds".

Final Office Action dated Sep. 1, 2009 of parent U.S. Appl. No. 11/135,450.
Non-Final Office Action dated Jan. 27, 2009 of parent U.S. Appl. No. 11/135,450.
Non-Final Office Action dated Jul. 6, 2009 of parent U.S. Appl. No. 11/135,288.
Final Office Action dated Dec. 23, 2008 of parent U.S. Appl. No. 11/135,288.
Non-Final Office Action dated Mar. 31, 2008 of parent U.S. Appl. No. 11/135,288.
Final Office Action dated Oct. 17, 2007 of parent U.S. Appl. No. 11/135,288.
Non-Final Office Action dated Feb. 6, 2007 of parent U.S. Appl. No. 11/135,288.
Final Office Action dated Nov. 10, 2010 of corresponding U.S. Appl. No. 11/135,450.
Non-Final Office Action dated Jun. 23, 2011 of corresponding U.S. Appl. No. 11/135,450.
Non-Final Office Action dated Jul. 26, 2012 of corresponding U.S. Appl. No. 11/135,450.
Final Office Action dated Jan. 9, 2013 of corresponding U.S. Appl. No. 11/135,450.
Final Office Action dated Mar. 19, 2012 of corresponding U.S. Appl. No. 11/135,450.
Notice of Allowance dated Jun. 3, 2013 of corresponding U.S. Appl. No. 11/135,450.

* cited by examiner

HIGHLY NEUTRALIZED POLYMERIC COMPOSITIONS FOR GOLF BALL LAYERS

CROSS-REFERENCE TO RELATED APPLICATIONS

This application is a continuation-in-part of U.S. patent application Ser. No. 11/135,450, filed May 24, 2005, now pending, and U.S. patent application Ser. No. 11/135,288, filed May 24, 2005, now U.S. Pat. No. 7,744,494, the entire disclosures of which are incorporated by reference herein.

FIELD OF THE INVENTION

The present invention relates to compositions for golf balls that include highly neutralized polymers having high melt flow, improved moisture resistance, and increased stiffness. In particular, the highly neutralized polymeric compositions of the invention may be used in any layer of a golf ball, e.g., an outer cover layer, an inner cover layer, or a core layer.

BACKGROUND OF THE INVENTION

Over the past years, golf ball manufacturers have been using ionomer resins for golf ball cover materials because of their durability, rebound, and scuff resistance characteristics. Ionomer resins are generally understood as copolymers of an olefin and an $\alpha,\beta$-unsaturated carboxylic acid, e.g., acrylic acid, methacrylic acid, or maleic acid, wherein the acidic groups are partially neutralized with metal ions such as sodium, lithium, zinc, or magnesium ions. For example, ethylene ionomers are copolymers of ethylene and a partially neutralized unsaturated carboxylic acid such as methacrylic acid or acrylic acid.

While ionomer resins are more durable than other types of golf ball layer materials, the same properties that result in durability also provide a hard "feel" and generally result in a lower spin rate and, thus, lower control, due to the hardness of the material. As such, manufacturers have experimented with the type of ionomer, the amount of acid in the ionomeric composition, blends of different types of ionomers, and blends of ionomers with non-ionic polymers in an effort to achieve a composition that provides the "feel" and performance desired while still maintaining the durability and resilience inherent to ionomers.

For example, blends of ionomers neutralized with different metal salts have been used to improve low temperature cracking resistance and achieve improvements in initial velocity over compositions including single ionomers. In particular, the specific salts used, the level of neutralization of the acid groups, and the blend composition influence the distance and durability of the ball, as well as spin characteristics and "feel."

In addition, the use of high acid ionomers, i.e., ionomers having more than about 16 percent acid content, have been employed to achieve higher coefficient of restitution values. However, because a higher amount of acid generally relates to a greater hardness, the use of high acid ionomers obviously has drawbacks including the "feel" and the degree of spin one is impart to the ball. As such, the use of a softening comonomer, such as alkyl acrylate, has been used in high acid ionomeric compositions in an effort to improve the "feel."

Further attempts to compensate for the deficiencies of ionomeric compositions have resulted in blends of hard ionomer resins, i.e., resins with hardness values of about 60 Shore D and above, with relatively softer polymeric materials. For example, blends of hard ionomers with polyurethanes have been used to form intermediate layers and cover layers of golf balls. However, such blends generally have processing difficulties associated with their use in the production of golf balls. In fact, while blends of one variety of polymer, such as ionomers, have been successfully used in golf balls, blends of one type of ionomeric polymer with other non-ionic polymers are typically immiscible, i.e., heterogeneous on a microscopic scale, and incompatible, i.e., heterogeneous on a macroscopic scale, unless strong interactions are present between the polymer components in the mixture. For example, a lack of compatibility exists when an ionomer is blended with a polyolefin homopolymer, copolymer, or terpolymer that does not contain ionic, acidic, basic, or other polar pendant groups, and is not produced with a metallocene catalyst. These mixtures often have poor tensile strength, impact strength, and the like. Hence, the golf balls produced from these incompatible mixtures will have inferior golf ball properties such as poor durability, cut resistance, and the like.

As such, the level of neutralization of ionomers has become a larger focus over the past several years for golf ball manufacturers. In fact, while dependent on the type of metal cation or salt used to neutralize the acid groups in the acid copolymer, the coefficient of restitution can be manipulated with an increase in neutralization. For example, when ionomers are neutralized with alkali metal salts, increasing neutralization or increasing cation size corresponds to decreasing coefficient of restitution. In contrast, when transition metal salts are used to neutralize the acid groups, the COR increases with increased neutralization.

Those of ordinary skill in the art are aware, however, that increasing the neutralization of ethylene-based ionomers during manufacturing reduces the processability of the material. This is demonstrated by the decreased melt flow index of the resulting material. Once the percent of neutralization is greater than about 60 percent (depending on metal cation or salt selected), the melt flow of the ionomer becomes too low and the ease of processablilty decreases. In fact, in some cases, the melt flow index of the material is decreased to the point that the material does not flow at all. As a result, commercially available ethylene-based ionomers are generally only partially neutralized.

And, while highly neutralized polymers, i.e., having a level of neutralization of about 70 percent or higher, are commercially available, these polymers are generally produced using salts of fatty acids. Potential compatibility issues remain with these highly neutralized polymers, however, due to their hydrophobic backbone moiety. In addition, the non-neutralized fatty acids may vaporize during injection molding causing molding defects and defects during post-processing, e.g., during painting, coating, and the like.

In addition, the significant amount of moisture absorbed by these materials and the processing difficulties associated with the moisture results in poor golf ball performance. In fact, the plasticization of ionic aggregrates by water molecules cause voids that ultimately result in decreased coefficient of restitution and stiffness when such materials are used in components of a golf ball.

Thus, a need exists in the golf ball art for a resin material that is easily processed with desirable melt flow and molding characteristics. In addition, a need exists in the art for a method to mold this resin material into highly durable golf balls with improved performance and tailorable to have virtually any combination of feel and spin rate.

SUMMARY OF THE INVENTION

The present invention is directed to a golf ball including: a core having a diameter of about 1.50 inches to about 1.62 inches and a compression of about 120 atti or less formed of a composition including: a copolymer of ethylene and an α,β-unsaturated carboxylic acid, wherein about 70 percent or greater of the acid groups in the copolymer are neutralized with a cation; and a flow modifier present in an amount of about 15 parts per hundred to about 75 parts per hundred based on a hundred parts of the copolymer, wherein the flow modifier includes a fatty acid salt, wherein the composition has a melt flow index of about 2.0 g/10 min or greater at 190° C. using a 2160 gram weight; and a cover having a thickness of about 0.03 to about 0.09 inches.

In this aspect of the invention, the melt flow index of the composition is about 2.5 g/10 min or greater at 190° C. using a 2160 gram weight. In one embodiment, the melt flow index is about 10 g/10 min or greater at 190° C. using a 2160 gram weight. The flow modified may be present in an amount of about 25 parts per hundred to about 75 parts per hundred based on a hundred parts of the copolymer. In one embodiment, the composition further includes a softening comonomer including alkyl acrylate.

The cover may include a castable thermoset material or thermoplastic material. In one embodiment, the cover castable reactive liquid polyurethane, polyurea, epoxy resin, or polyamide or a copolymer including urethane and urea segments.

The present invention is also directed to a golf ball including: a core having a diameter of about 1.50 inches to about 1.60 inches; an intermediate layer having a thickness of about 0.015 inches to about 0.06 inches; and a cover having a thickness of about 0.02 to about 0.045 inches, wherein at least one layer in the golf ball is formed from a composition including: a copolymer of ethylene and an α,β-unsaturated carboxylic acid, wherein about 80 percent or greater of the acid groups in the copolymer are neutralized with a cation; and a flow modifier present in an amount of about 25 parts per hundred to about 75 parts per hundred based on a hundred parts of the copolymer, wherein the flow modifier includes a fatty acid salt, wherein the composition has a melt flow index of about 2.0 g/10 min or greater at 190° C. using a 2160 gram weight.

In this aspect of the invention, about 90 percent or greater of the acid groups in the copolymer may be neutralized with a cation. In one embodiment, the cation source is selected from a group consisting of metal cations of lithium, sodium, potassium, magnesium, calcium, barium, lead, tin, zinc, or aluminum. The fatty acid salt may include stearic acid, behenic acid, erucic acid, oleic acid, linoelic acid or dimerized derivatives thereof and a cation selected from the group consisting of barium, lithium, sodium, zinc, bismuth, chromium, cobalt, copper, potassium, strontium, titanium, tungsten, magnesium, cesium, iron, nickel, silver, aluminum, tin, and calcium For example, the fatty acid salt may be zinc stearate.

In one embodiment, the intermediate layer is formed from the composition. In another embodiment, the core is formed from the composition.

The present invention also relates to a golf ball including: a core having a diameter of about 0.5 inches to about 1.30 inches; an outer core layer having a thickness of about 0.125 inches to about 0.5 inches; an inner cover layer disposed about the outer core layer having a thickness of about 0.015 inches to about 0.06 inches; and an outer cover layer disposed about the inner cover layer having a thickness of about 0.02 to about 0.045 inches, wherein the golf ball has a compression of about 50 to about 100 atti and a coefficient of restitution of at least about 0.805 at 125 ft/sec, and wherein at least one layer in the golf ball is formed from a composition including: a copolymer of ethylene, an α,β-unsaturated carboxylic acid, and an optional comonomer, wherein about 70 percent or greater of the acid groups in the copolymer are neutralized with a cation; and a flow modifier present in an amount of about 15 parts per hundred to about 75 parts per hundred based on a hundred parts of the copolymer, wherein the flow modifier includes a fatty acid salt, wherein the composition has a melt flow index of about 2.5 g/10 min or greater at 190° C. using a 2160 gram weight, wherein the composition has a flexural modulus of about 15,000 psi to about 75,000 psi.

In this aspect of the invention, the comonomer may be present in an amount of about 0 percent to 10 percent by weight of the copolymer. In one embodiment, about 90 percent or greater of the acid groups in the copolymer are neutralized with a cation. In another embodiment, about 100 percent or greater of the acid groups in the copolymer are neutralized with a cation.

In one embodiment, the core includes the composition. In another embodiment, the outer core layer includes the composition.

The present invention is also directed to a one-piece golf ball formed from a composition including: a copolymer of ethylene and an α,β-unsaturated carboxylic acid, wherein about 80 percent or greater of the acid groups in the copolymer are neutralized with a cation; and a flow modifier present in an amount of about 25 parts per hundred to about 75 parts per hundred based on a hundred parts of the copolymer, wherein the flow modifier includes a fatty acid salt, wherein the composition has a melt flow index between about 2.5 g/10 min to about 20 g/10 min at 190° C. using a 2160 gram weight and a flexural modulus between about 15,000 and about 75,000 psi after two weeks, wherein the golf ball has a coefficient of restitution of about 0.820 at 125 ft/s or greater.

In one embodiment, the golf ball has a coefficient of restitution of about 0.840 to about 0.855 at 125 ft/s. In another embodiment, the composition has a hardness of about 20 Shore D to about 80 Shore D.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
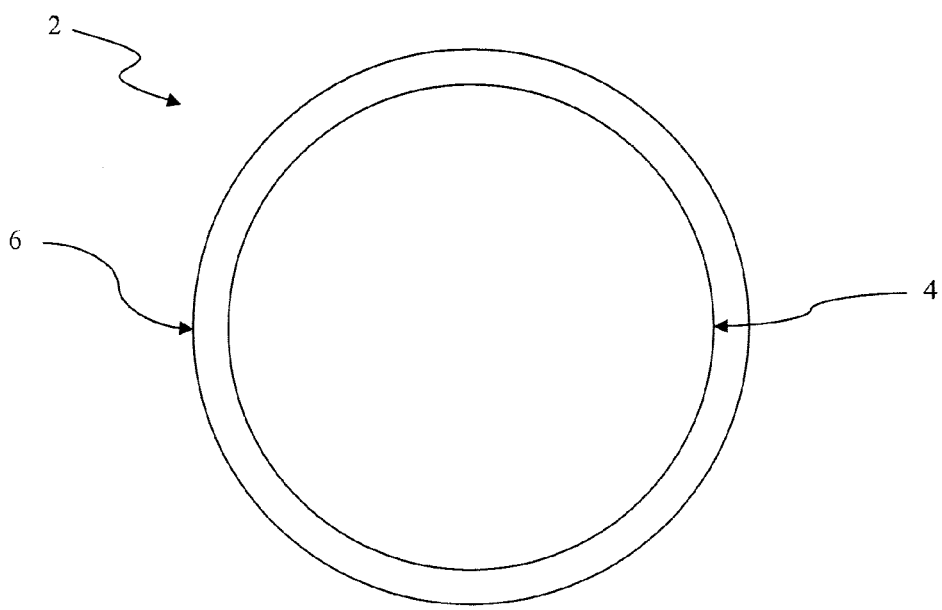
FIG. 1 is a cross-sectional view of a two-piece golf ball, wherein the cover is formed from a composition of the invention.

The present invention relates to compositions for use in golf balls including highly or fully neutralized polymers. In particular, the compositions of the invention provide an alternative to materials that have processing, delamination, moisture resistance, and stiffness issues when used in layers of golf balls. In addition, the present invention explores the methods of making such compositions and the golf balls that are formed using the compositions.

The compositions of the invention can be used with a variety of golf ball constructions. For example, the compositions of the invention may be used as a cover layer in a two-piece ball with a large core, an outer cover layer in a three-piece ball with a relatively thin inner cover layer, an intermediate layer in a three-piece ball, or an inner cover layer in a golf ball having dual cover layers. In addition, the compositions of the invention may be used in cores of golf balls having outer components formed from castable reactive liquid materials or injection moldable thermoplastic materials. The composition components, golf ball constructions, and layer and ball properties are discussed in greater detail below.

The Compositions of the Invention

The compositions of the invention include a modified highly neutralized polymer ("HNP") and blends thereof. In particular, the compositions of the invention include at least one highly neutralized polymer and at least one flow modifier. The use of a highly neutralized polymer results in a higher stiffness while the flow modifier compensates for the decrease in melt flow index generally associated with a high level of neutralization and improves the moisture resistance of the composition.

Highly Neutralized Polymer

The HNPs are preferably ionomers and/or their acid precursors that have been highly neutralized by organic fatty acids. For example, the HNP may be based on an acid copolymer of an olefin and an $\alpha,\beta$-unsaturated carboxylic acid. In one embodiment, the olefin is ethylene, propylene, or butylene. The olefin may be present in an amount of about 80 to about 90 weight percent of the copolymer.

The $\alpha,\beta$-unsaturated carboxylic acid may be any suitable $C_{3-8}$ $\alpha,\beta$-ethylenically unsaturated carboxylic acid, such as acrylic and methacrylic acid, as well as maleic acid, fumaric acid, or itaconic acid. As such, suitable acid-containing ethylene copolymers include ethylene/acrylic acid copolymers, ethylene/methacrylic acid copolymers, and combinations thereof.

The HNPs of the invention may be based on "low acid" or "high acid" copolymers. In general, ionic copolymers including up to about 16 percent acid are considered "low acid", while those including greater than about 16 percent acid are considered "high acid." For example, a high acid copolymer may be a copolymer of an olefin and greater than about 16 weight percent of the $\alpha,\beta$-ethylenically unsaturated carboxylic acid. Alternatively, a low acid copolymer may be a copolymer of an olefin and about 16 percent or less of an $\alpha,\beta$-ethylenically unsaturated carboxylic acid.

In one embodiment, the $\alpha,\beta$-unsaturated carboxylic acid is present in an amount of about 10 to about 20 weight percent of the copolymer. In another embodiment, the $\alpha,\beta$-unsaturated carboxylic acid is present in an amount of about 13 to about 18 weight percent of the copolymer. In yet another embodiment, about 15 to about 15.8 weight percent of the copolymer is the $\alpha,\beta$-unsaturated carboxylic acid.

The acid copolymers may optionally contain a softening monomer, such as alkyl acrylate and alkyl methacrylate, wherein the alkyl groups have from 1 to 8 carbon atoms. For example, the softening comonomer may be methyl acrylate, ethyl acrylate, propyl acrylate, butyl acrylate, methyl methacrylate, ethyl methacrylate, propyl methacrylate, butyl methacrylate, or a combination thereof. In this aspect, the acid copolymers can be described as E/X/Y terpolymers where E is ethylene, X is an $\alpha,\beta$-ethylenically unsaturated carboxylic acid, and Y is a softening comonomer. For example, X may be acrylic or methacrylic acid and Y may be a $C_{1-8}$ alkyl acrylate or methacrylate ester.

In one embodiment, X is present in an amount from about 1 to about 35 weight percent of the terpolymer, preferably from about 5 to about 30 weight percent of the terpolymer, and more preferably from about 10 to about 20 weight percent of the terpolymer. Y may be present in an amount from about 0 to about 50 weight percent of the terpolymer, preferably from about 5 to about 25 weight percent of the terpolymer, and more preferably from about 10 to about 20 weight percent of the terpolymer. In another embodiment, X is present in an amount of about 10 to about 20 weight percent of the terpolymer and Y is present in an amount of about 0 to about 10 weight percent of the terpolymer. In yet another embodiment, X is present in about 2 to about 30 weight percent, preferably about 4 to about 20 weight percent, and more preferably about 5 to about 15 weight percent of the polymer, and Y is preferably present in about 17 to about 40 weight percent, preferably about 20 to about 40 weight percent, and more preferably about 24 to about 35 weight percent of the polymer to produced a soft, high resilient polymer.

Specific acid-containing E/X/Y copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers In one embodiment, the E/X/Y copolymers include ethylene/(meth)acrylic acid/n-butyl, acrylate, ethylene/(meth)acrylic acid/ethyl acrylate, ethylene/(meth) acrylic acid/methyl acrylate copolymers, or mixtures thereof.

The acid copolymers of the present invention may be prepared from "direct" acid copolymers, copolymers polymerized by adding all monomers simultaneously, or by grafting of at least one acid-containing monomer onto an existing polymer.

The acid moieties of the HNPs are neutralized greater than about 70 percent. In one embodiment, the neutralization level is about 80 percent or greater. In another embodiment, the neutralization level is about 90 percent or higher. In yet another embodiment, the HNP is fully neutralized, i.e., all of the acid moieties (100 percent) are neutralized.

Neutralization may occur with a metal cation such as lithium, sodium, potassium, magnesium, calcium, barium, lead, tin, zinc, aluminum, or a mixture thereof either prior to the addition of the flow modifier or during or after in-situ polymerization or extrusion with the flow modifier. In one embodiment, neutralization is affected by the addition of a metal cation selected from Li, Na, Mg, Zn, or a combination thereof.

In one embodiment, a conventional ionomer that has already been partially neutralized to a certain degree (less than about 70 percent) may be used as the base copolymer, which is then further neutralized to about 70 percent to become a HNP in accordance with the present invention. As used herein, the term "conventional ionomer" is intended to encompass those polymers obtained by copolymerization of an acidic or basic monomer, such as alkyl (meth)acrylate, with at least one other comonomer, such as an olefin, styrene or vinyl acetate, followed by at least partial neutralization.

For example, a commercially available ionomer that has already been partially neutralized to a certain degree (less than about 70 percent) may be used as the base copolymer, which is then further neutralized to about 70 percent to become a HNP in accordance with the present invention. In this aspect, commercially available copolymers suitable for use with the present invention include SURLYN® ionomers from DuPont and Iotek® ionomers from Exxon. For example, SURLYN® 8940 (Na), SURLYN® 9650 (Zn), and SURLYN® 9910 (Zn) are examples of low acid ionomer resins with the acid groups that have been neutralized to a certain degree with a cation. More examples of suitable low acid ionomers, e.g., Escor® 4000/7030 and Escor® 900/8000, are disclosed in U.S. Pat. Nos. 4,911,451 and 4,884,814, the disclosures of which are incorporated by reference herein. High acid ionomer resins include SURLYN® 8140 (Na) and SURLYN® 8546 (Li), which have a methacrylic acid content of about 19 percent. The acid groups of these high acid ionomer resins that have been neutralized to a certain degree with the designated cation.

Alternatively, acidic or basic groups may be incorporated into a polymer to form an ionomer by reacting the polymer, such as polystyrene or a polystyrene copolymer including a block copolymer of polystyrene, with a functionalizing reagent, such as a carboxylic acid or sulfonic acid, followed by at least partial neutralization. Suitable neutralizing sources include cations for negatively charged acidic groups and anions for positively charged basic groups. Other suitable ionomers for use as the base copolymer in accordance with the present invention include polyolefins, polyesters, polystyrenes, SBS, SEBS, and polyurethanes, in the form of homopolymers, copolymers, or block copolymer ionomers with a neutralization level of about 70 percent or greater.

In another embodiment, the HNP for use in the compositions of the present invention may be a commercially available polymer with a degree of neutralization about 70 percent or greater, such as HPF 1000 and 2000 from DuPont. These polymers, which are neutralized with magnesium ions, have relatively low melt flow index values, which may be improved upon with the addition of the flow modifier, discussed in greater detail below. In fact, HPF 1000 has a melt flow index of 0.65 g/10 min and HPF 2000 has a melt flow index of 1.0 g/10 min (based on ASTM D-1238).

In yet another embodiment, the HNP can be formed from an acid copolymer that is neutralized by one or more amine-based or an ammonium-based components, or mixtures thereof, as disclosed in U.S. Pat. No. 7,160,954, which is incorporated in its entirety by reference herein.

Flow Modifiers

The flow modifier for use in the compositions of the invention may be aromatic and aliphatic acid or salts thereof. For example, the flow modifier may be a saturated or unsaturated fatty acid salt. The addition of the flow modifier improves the melt flow index, stiffness, and moisture resistance of the HNP. In addition, the flow modifier minimizes the loss of resilience and maximizes the coefficient of restitution.

Suitable flow modifiers include, but are not limited to, aliphatic, mono- or multi-functional (saturated, unsaturated, or multi-unsaturated) organic acids and salts thereof. In one embodiment, the organic acids are preferably saturated or unsaturated fatty acids or fatty acid salts. Suitable fatty acids include, but are not limited to, stearic acid, behenic acid, erucic acid, oleic acid, linoelic acid, myristic acid, palmitic acid, decanoic acid, or dimerized derivatives.

Saturated fatty acids do not contain any double bonds or other functional groups along the chain. Unsaturated fatty acids have one or more alkenyl functional groups along the chain. In other words, an unsaturated fatty acid has a double or triple bond in the alkyl group, whereas a saturated fatty acid contains only single bonds in the alkyl group. In one embodiment, the flow modifier is a saturated fatty acid such as butyric acid, caproic acid, caprylic acid, capric acid, lauric acid, myristic acid, palmitic acid, stearic acid, arachidic acid, behenic acid, lignoceric acid, and the like. Unsaturated fatty acids suitable for use as the flow modifier of the present invention include, but are not limited to, myristoleic acid, palmitoleic acid, oleic acid, linoleic acid, α-linolenic acid, arachidonic acid, eicosapentaenoic acid, erucic acid, and docosahexaenoic acid.

Suitable salts of fatty acids for use in accordance with the present invention, which may be formed by replacing one or more of the hydrogen atoms of the acid with an anion or cation, include, but are not limited to, barium salts, lithium salts, sodium salts, zinc salts, bismuth salts, chromium salts, cobalt salts, copper salts, potassium salts, strontium salts, titanium salts such as 2-ethylhexyl titanate, tungsten salts, magnesium salts, cesium salts, iron salts, nickel salts, silver salts, aluminum salts, tin salts, calcium salts of fatty acids.

For example, barium, lithium, sodium, zinc, bismuth, chromium, cobalt, copper, potassium, strontium, titanium, tungsten, magnesium, cesium, iron, nickel, silver, aluminum, tin, or calcium salts of stearic, behenic, erucic, oleic, linoelic or dimerized derivatives thereof are contemplated for use as the flow modifier in accordance with the present invention. In one embodiment, the flow modifier includes at least one of zinc stearate, magnesium stearate, calcium stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate, zinc lignocerate, or mixtures thereof. In another embodiment, the flow modifier is zinc stearate.

The flow modifier is preferably selected such that the molecular weight is much less than the HNP, e.g., about 200 or greater, about 2000 or less, or somewhere in between. The small molecular weight of the flow modifier allows proper adjustment of the melt flow index of the resulting composition.

In this aspect of the invention, the flow modifier is added in an amount of about 15 parts per hundred (pph) to about 75 pph based on a hundred parts of the polymer. In one embodiment, the flow modifier is added in an amount of about 20 pph to about 70 pph. In another embodiment, the flow modifier is present in an amount of about 25 pph to about 50 pph. In yet another embodiment, the flow modifier is added in an amount of about 25 pph to about 75 pph.

Process of Making the Compositions of the Invention

The modified HNPs of the invention may be made in a variety of ways. For example, the compositions of the invention may be produced by melt-blending a HNP with a flow modifier. In one embodiment, the HNP and the flow modifier are combined with a single-screw or twin-screw extruder, or other suitable polymer mixing equipment.

In another embodiment, an ionomer or acid copolymer may be formed by in-situ polymerization in the presence of the flow modifier to form a modified copolymer. Reactive processing with a suitable cation to achieve a neutralization level about 70 percent or greater is then undertaken. Those of ordinary skill in the art understand that in-situ polymerization refers to forming a polymeric material in the presence of a previously formed polymeric material and that the reactive processing with the cation occurs in the same reactor.

In yet another embodiment, an ionomer or acid copolymer is formed by in-situ polymerization, then exposed to reactive processing with the flow modifier and suitable cation to achieve a level of neutralization about 70 percent or greater to form a modified HNP according to the present invention.

In still another embodiment, the acid copolymer and a second polymer component are subjected to in-situ polymerization followed by reactive processing with a suitable cation or anion. The flow modifier may be added during the in-situ polymerization or reactive processing portions of the process. The second polymer component may include, but is not limited to, ionomeric copolymers or terpolymers, ionomeric precursors, thermoplastic and thermoset materials such as polyamides, polycarbonates, polyesters, polyurethanes, polyureas, thermoplastic elastomers, polybutadiene rubber, balata, grafted and non-grafted metallocene-catalyzed polymers, single-site polymers, high-crystalline acid polymers, cationic polymers, and mixtures thereof.

Composition/Material Properties

The modified HNP of the invention preferably has a melt flow index of about greater than about 1 g/10 min in accordance with ASTM D-1238, condition E, at 190° C., using a 2160 gram weight. In one embodiment, the melt flow index is about 1.5 g/10 min or greater. In another embodiment, the melt flow index is about 2.0 g/10 min or greater. For example, the melt flow index may be about 2.5 g/10 min or greater at 190° C. In yet another embodiment, the melt flow index of the composition of the invention is about 2.5 g/10 min to about 20 g/10 min at 190° C.

In this aspect of the invention, the modified HNP of the invention preferably has a melt flow index that is at least about 25 percent higher than the melt flow index of a highly neutralized polymer that is not modified with a flow modifier according to the present invention. In one embodiment, the melt flow index is at least about 50 percent higher than the melt flow index of an unmodified HNP. In another embodiment, the melt flow index is at least about 75 percent higher than the melt flow index of an unmodified HNP. In still another embodiment, the melt flow index is at least about 100 percent higher than the melt flow index of an unmodified HNP.

The compositions of the invention preferably provide a certain degree of stiffness while maintaining a soft feel. Thus, the compositions of the invention preferably have a flexural modulus, as measured per ASTM D6272-02 (three-point bending), of about 10,000 psi to about 80,000 psi at 40 hours. In one embodiment, the flexural modulus of the compositions of the invention is about 15,000 psi to about 70,000 psi at 40 hours. In another embodiment, the compositions have a flexural modulus of about 17,000 psi to about 55,000 psi at 40 hours.

As known to those of ordinary skill in the art, depending on the material, the flexural modulus values typically increases over time. As such, the flexural modulus of the compositions of the invention is about 15,000 psi to about 75,000 psi at 2 weeks. In another embodiment, the flexural modulus of the compositions of the invention is about 15,000 psi to about 50,000 psi at 2 weeks, preferably about 15,000 psi to about 40,000 psi at 2 weeks. For example, the compositions of the invention may have a flexural modulus of about 15,000 psi to about 30,000 psi after 2 weeks.

The material hardness of the compositions of the invention is between about 20 Shore and 80 Shore D. In one embodiment, the Shore D hardness is between about 30 and 60. In another embodiment, the hardness ranges from about 35 Shore D and 55 Shore D. In still another embodiment, the hardness is between about 38 Shore D and 50 Shore D. For example, the Shore D hardness of a modified HNP of the invention is between about 40 Shore D and 48 Shore D.

It should be understood, especially to one of ordinary skill in the art, that there is a fundamental difference between "material hardness" and "hardness, as measured directly on a golf ball." Material hardness is defined by the procedure set forth in ASTM-D2240-00 and generally involves measuring the hardness of a flat "slab" or "button" formed of the material of which the hardness is to be measured. Generally, ASTM-D2240-00 requires calibration of durometers, which have scale readings from 0 to 100. However, readings below 10 or above 90 are not considered reliable, as noted in ASTM-D2240-00, and accordingly, all the hardness values herein are within this range.

Blends

The modified HNPs of the present invention may also be blended with a second polymer component, which, if containing an acid group, may be neutralized in a conventional manner or by the method of the present invention.

The compositions of the invention preferably include about 1 percent to about 100 percent of the modified HNP. In one embodiment, the compositions contain about 10 percent to about 90 percent of the modified HNP, preferably from about 10 percent to about 75 percent of the modified HNP, and about 90 percent to 10 percent, more preferably from about 90 percent to about 25 percent of the second polymer component and/or other materials as described below. For example, a blend in accordance in the present invention may have about 10 percent to about 40 percent of the modified HNP and about 60 percent to about 90 percent of another thermoplastic polymer, e.g., a conventional ionomer. In an alternate embodiment, a blend in accordance with the invention may include about 40 percent to about 80 percent of the modified HNP and about 20 percent to about 60 percent of another thermoplastic polymer. Unless otherwise stated herein, all percentages are given in percent by weight of the total composition of the golf ball layer in question.

The second polymer component may include ionomeric copolymers or terpolymers, ionomeric precursors, thermoplastics, polyamides, polycarbonates, polyesters, polyurethanes, polyureas, thermoplastic elastomers, polybutadiene rubber, balata, grafted and non-grafted metallocene-catalyzed polymers, single-site polymers, high-crystalline acid polymers, cationic polymers, cationic and anionic urethane ionomers and urethane epoxies, polyurethane ionomers, polyurea ionomers, epoxy resins, polyethylenes, polyacrylin, siloxanes, and mixtures thereof.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention that are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

One of ordinary skill in the art would be well aware of methods to blend these polymeric materials with the modified HNPs of the invention to form a composition for use in golf ball layers. Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized.

Additives

The compositions of the invention may include a variety of additives. For example, the compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Fillers may also be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

When the compositions of the invention are used in the core layers of the golf ball, fillers may also be used to modify the weight of the core to create a specialty ball, e.g., a lower weight ball is preferred for a player having a low swing speed.

Additional materials conventionally included in other golf ball compositions may also be included in the compositions of the invention. For example, antioxidants, stabilizers, softening agents, plasticizers, including internal and external plasticizers, reinforcing materials, and compatibilizers may also be added to any composition of the invention. Those of ordinary skill in the art are aware of the purpose of these additives and the amounts that should be employed to fulfill those purposes.

Golf Ball Construction

As discussed briefly above, the compositions of the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the compositions of the invention may be used in a core, an intermediate layer, and/or a cover of a golf ball, each of which may have a single layer or multiple layers.

As used herein, the term "multilayer" means at least two layers. For instance, the core may be a one-piece core or a multilayer core, i.e., a core that has an innermost component with an additional core layer or additional core layers disposed thereon. As used herein, the terms "core" and "center" are generally used interchangeably to reference the innermost component of the ball. In some embodiments, however, the term "center" is used when there are multiple core layers, i.e., a center and an outer core layer.

When the golf ball of the present invention includes an intermediate layer, which may also include more than one layer, this layer may be incorporated with a single or multi-layer cover, a single or multi-piece core, with both a single layer cover and core, or with both a multilayer cover and a multilayer core. The intermediate layer may be also be referred to as an inner cover layer or outer core layer, or any other layer(s) disposed between the inner core and the outer cover of a golf ball.

Referring to FIG. 1, a golf ball 2 of the present invention can include a center 4 and a cover 6 surrounding the center 4. While dimensions and materials are discussed in more detail below, a golf ball of the invention can include a large core, e.g., about 1.55 inches to about 1.60 inches, and a relatively soft, thin cover formed from the composition of the invention.

Figure 2:
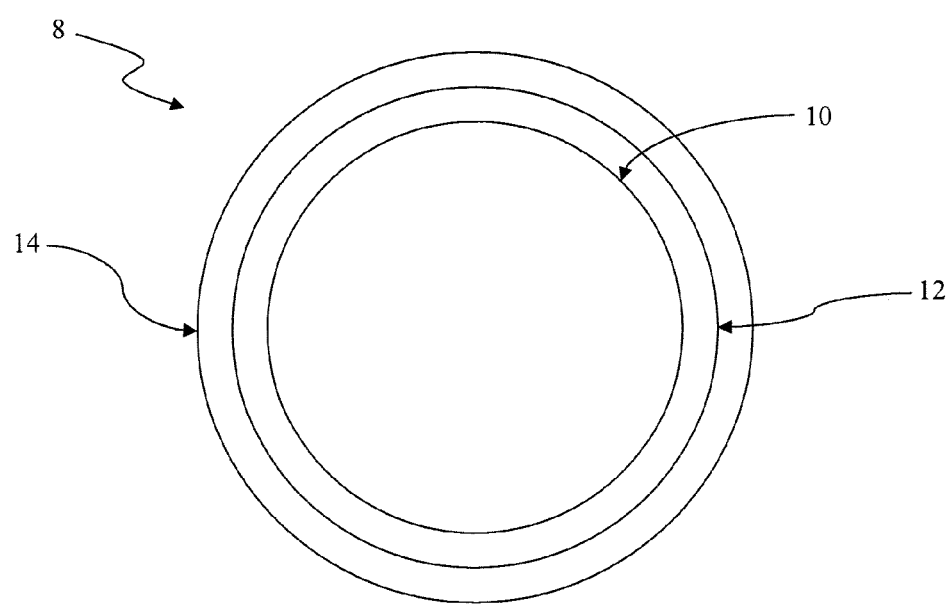
FIG. 2 is a cross-sectional view of a multi-component golf ball, wherein at least one layer is formed from a composition of the invention.
Figure 3:
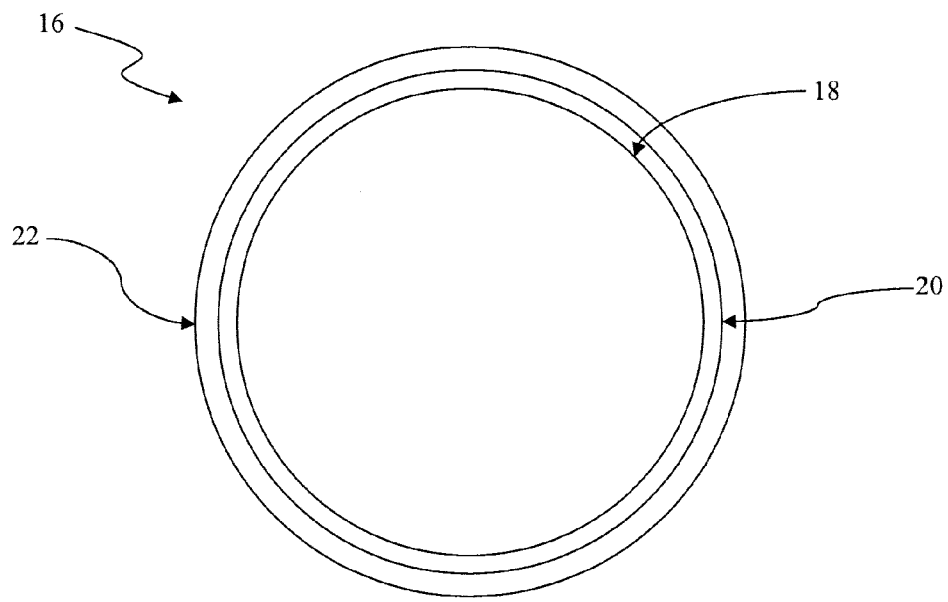
FIG. 3 is a cross-sectional view of a multi-component golf ball having a large core, wherein at least one layer is formed from a composition of the invention.

Referring to FIG. 2, a golf ball 8 of the present invention can include a center 10, a cover 14, and at least one intermediate layer 12 disposed between the cover and the center. Each of the cover and center layers in FIG. 1 or 2 may include more than one layer, i.e., the golf ball can be a conventional three-piece wound ball, a two-piece ball, a ball having a multi-layer core and an intermediate layer or layers, etc. Also, FIG. 3 shows a golf ball 16 of the present invention including a large core 18, a cover 22, and an inner cover layer 20. In one embodiment, the core 18 includes a center and an outer core layer.

Figure 4:
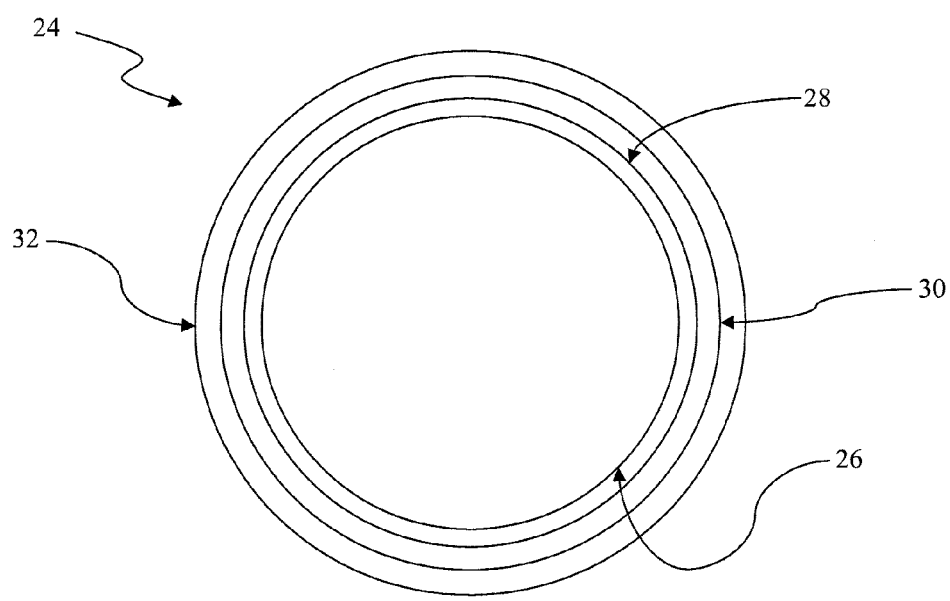
FIG. 4 is a cross-sectional view of a multi-component golf ball including a dual core and a dual cover, wherein at least one layer is formed from a composition of the invention.

In another embodiment, as shown in FIG. 4, a golf ball 24 of the present invention can include a large core having a center 26 and an intermediate layer 28 disposed underneath a dual cover having an inner cover layer 30 and an outer cover layer 32. Further, any of the figures detailed herein may include embodiments wherein an optional wound layer is disposed between the center and the core of the golf ball.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Golf Ball Core Layer(s)

The cores of the golf balls formed according to the invention may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like.

The core may be formed from the compositions of the invention. For example, a core formed from the composition of the invention may be covered with a castable thermoset or injection moldable thermoplastic material or any of the other cover materials discussed below. The core may have a diameter of about 1.5 inches to about 1.62 inches and the cover layer thickness may range from about 0.03 inches to about 0.06 inches. The core compression preferably ranges from about 30 to about 120 atti and the overall ball compression is about 50 to about 110.

When not formed from the compositions of the invention, any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. For example, butadiene rubber, which, in an uncured state, typically has a Mooney viscosity (measured according to ASTM D1646-99) greater than about 20, preferably greater than about 30, and more preferably greater than about 40, may be used in one or more core layers of the golf balls prepared according to the present invention. In addition, the compositions of the invention may be incorporated the core.

A free-radical source, often alternatively referred to as a free-radical initiator, may optionally be used in the core, or one or more layers of the golf balls according to the invention, particularly when a polymer component includes a thermoset material. The free radical source for is preferably a peroxide, more preferably an organic peroxide. The peroxide is typically present in an amount greater than about 0.1 parts per hundred of the total polymer component, preferably about 0.1 to 15 parts per hundred of the polymer component, and more preferably about 0.2 to 5 parts per hundred of the total polymer component. It should be understood by those of ordinary skill in the art that the presence of certain components may require a larger amount of free-radical source than the amounts described herein. The free radical source may alternatively or additionally be one or more of an electron beam, UV or gamma radiation, x-rays, or any other high energy radiation source capable of generating free radicals. It should be further understood that heat often facilitates initiation of the generation of free radicals when peroxides are used as a free-radical initiator.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials.

In one embodiment, the intermediate layer is formed, at least in part, from the composition of the invention. For example, an intermediate layer or inner cover layer having a thickness of about 0.015 inches to about 0.06 inches may be disposed about a core. In this aspect of the invention, the core, which has a diameter ranging from about 1.5 inches to about 1.59 inches, may also be formed from a composition of the invention or, in the alternative, from a conventional rubber composition. The inner ball may be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches. The core compression is about 30 to about 110 atti, preferably about 50 to about 100 atti, and the overall ball compression preferably ranges from about 50 to about 100 atti.

In another embodiment, the intermediate layer is covered by an inner cover layer, either of which may independently be formed from the compositions of the invention. For example, a ball of the invention may include a center having a diameter of about 0.5 inches to about 1.30 inches and a compression of about 30 to about 110 atti, preferably about 50 to about 100 atti. The center may be formed from a composition of the invention or any of the other core materials previously discussed. The core may be covered by an outer core layer to form a core, which also may be formed form the compositions of the invention, any of the core materials discussed above, or castable thermoset materials or injection moldable thermoplastic materials. The outer core layer may have a thickness of about 0.125 inches to about 0.500 inches. The core may then be covered with a casing layer having a thickness of about 0.015 inches to about 0.06 inches formed from a composition of the invention, a castable thermoset material or an injection moldable thermoplastic material. The outer cover layer, which preferably has a thickness of about 0.02 inches to about 0.045 inches, may be formed from a castable thermoset material or an injection moldable thermoplastic material or other suitable cover materials discussed below and known in the art.

When not formed from the compositions of the invention, the intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, such as those disclosed in U.S. Pat. No. 5,484,870, polyamides, acrylic resins and blends thereof, olefinic thermoplastic rubbers, block copolymers of styrene and butadiene, isoprene or ethylene-butylene rubber, copoly(ether-amide), such as PEBAX, sold by Atofina Chemicals, Inc. of Philadelphia, Pa., polyphenylene oxide resins or blends thereof, and thermoplastic polyesters.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

In one embodiment, the intermediate layer may be a moisture barrier layer as disclosed in U.S. Pat. No. 6,632,147. Thus, a golf ball of the invention may include an intermediate layer that has a moisture vapor transmission rate lower than that of the cover and, additionally, a primary ingredient of the intermediate layer is made from a material including polybutadiene, natural rubber, butyl-based rubber, acrylics, trans-polyisoprene, neoprene, chlorinated polyethylene, balata, multi-layer thermoplastic films, blends of ionomers, polyvinyl alcohol copolymer and polyamides, and dispersions of acid salts of polyetheramines. In another embodiment, golf balls of the invention include an intermediate layer or inner cover layer formed from the compositions of the invention and an additional moisture barrier layer.

The intermediate layer may also include a wound layer formed from a tensioned thread material. The thread may be single-ply or may include two or more plies. Suitable thread materials include, but are not limited to, fiber, glass, carbon, polyether urea, polyether block copolymers, polyester urea, polyester block copolymers, syndiotactic- or isotactic-poly (propylene), polyethylene, polyamide, poly(oxymethylene), polyketone, poly(ethylene terephthalate), poly(p-phenylene terephthalamide), poly(acrylonitrile), diaminodicyclohexylmethane, dodecanedicarboxylic acid, natural rubber, polyisoprene rubber, styrene-butadiene copolymers, styrene-propylene-diene copolymers, another synthetic rubber, or block, graft, random, alternating, brush, multi-arm star, branched, or dendritic copolymers, or mixtures thereof. Those of ordinary skill in the art are aware of the process for producing thread materials for use with the present invention.

Golf Ball Cover Layer(s)

The cover provides the interface between the ball and a club. Properties that are desirable for the cover are good moldability, high abrasion resistance, high impact resistance, high tear strength, high resilience, and good mold release, among others. The cover layer may be formed, at least in part, from a composition of the invention. For example, the present invention contemplates a golf ball having a large core of polybutadiene and a thin cover formed from the composition of the invention.

When the compositions of the invention are incorporated into a core or intermediate/inner cover layer, however, the cover may be formed from one or more homopolymeric or copolymeric materials as discussed in the section above pertaining to the intermediate layer. The cover may also be at least partially formed from a polybutadiene reaction product, as discussed above with respect to the core. Golf balls according to the invention may also be formed having a cover of polyurethane, polyurea, and polybutadiene materials discussed in U.S. Pat. No. 6,835,794.

In one embodiment, the cover is formed from a polyurethane material. For example, the cover may be formed from a polyurethane composition including the reaction product of at least one polyisocyanate, polyol, and at least one curing agent. Any polyisocyanate available to one of ordinary skill in the art is suitable for use according to the invention Exemplary polyisocyanates include, but are not limited to 4,4'-diphenylmethane diisocyanate ("MDI"); polymeric MDI; carbodiimide-modified liquid MDI; 4,4'-dicyclohexylmethane diisocyanate ("H$_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof.

Polyisocyanates are known to those of ordinary skill in the art as having more than one isocyanate group, e.g., di-isocyanate, tri-isocyanate, and tetra-isocyanate. In one embodiment, the polyisocyanate includes MDI, PPDI, TDI, or a mixture thereof, and preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14 percent unreacted NCO groups. In one embodiment, the at least one polyisocyanate has no greater than about 7.5 percent NCO, preferably less than about 7.0 percent NCO.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

The curative may be amine-terminated, hydroxy-terminated, or a combination of both. Both the hydroxy-terminated and amine-terminated curatives may include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Suitable hydroxyl-terminated curing agents include, but are not limited to, ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-($\beta$-hydroxyethyl)ether; hydroquinone-di-($\beta$-hydroxyethyl)ether; and mixtures thereof. The hydroxy-terminated curatives preferably have molecular weights ranging from about 48 to 2000. It should be understood that molecular weight, as used herein, is the absolute weight average molecular weight and would be understood as such by one of ordinary skill in the art.

Polyamine curatives suitable for use in the polyurethane composition of the invention include, but are not limited to 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyl-diamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. In one embodiment, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000.

The cover may also be formed from a polyurea-based material. Suitable polyurea-based material may be formed in several ways: a) from the reaction product of an isocyanate and amine-terminated compound prepolymer crosslinked with a curing agent; b) from the reaction product of an isocyanate and an amine-functionalized block copolymer; c) from the reaction product of a polyurea-based prepolymer and an amine-functionalized block copolymer; and d) by reacting an excess of a polyurea-based prepolymer and an amine-terminated block copolymer to form an intermediate prepolymer having the block copolymer capped at each end with isocyanate groups, which is cured with a curing agent. Examples of such materials are disclosed in U.S. Pat. No. 7,217,764, the entire disclosure of which is incorporated herein.

Layer Formation

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, such as the compositions of the invention, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer and/or cover layer may also be formed using any suitable method known to those of ordinary skill in the art. For example, an intermediate layer may be formed by blow molding and covered with a dimpled cover layer formed by injection molding, compression molding, casting, vacuum forming, powder coating, and the like. And, when a golf ball includes a cover layer formed from a composition of the invention, the HNP and flow modifier may be extruded with polymer mixing equipment, such as a single or twin-screw extruder, and then injection molded onto an inner ball.

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Furthermore, the resultant golf balls prepared according to the invention typically will have dimple coverage greater than about 60 percent, preferably greater than about 65 percent, and more preferably greater than about 70 percent.

In one embodiment, a golf ball of the invention includes a large core, e.g., about 1.55 inches to about 1.60 inches, and a thin cover, e.g., about 0.02 inches to abut 0.05 inches, that has a 392-count icosahedron dual dimple design. In another embodiment, the golf ball includes a slightly smaller core, e.g., about 1.50 inches to about 1.57 inches, and a slightly thicker cover, e.g., about 0.04 inches to abut 0.07 inches, that has a 392-count icosahedron dimple design with 5 different types of dimples.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Golf Ball Properties

The properties such as core diameter, intermediate layer and cover layer thickness, hardness, and compression have been found to effect play characteristics such as spin, initial velocity and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches (43 mm) to about 1.740 inches (44 mm) is most preferred, however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches. In one embodiment, the core diameter is about 1.59 inches or greater. In another embodiment, the diameter of the core is about 1.64 inches or less.

When the core includes an inner core layer and an outer core layer, the inner core layer is preferably about 0.5 inches or greater and the outer core layer preferably has a thickness of about 0.1 inches or greater. For example, when part of a multi-layer ball according to invention, the center may have a diameter ranging from about 0.5 inches to about 1.30 inches and the outer core layer may have a diameter ranging from about 0.12 inches to about 0.5 inches. In one embodiment, the inner core layer has a diameter from about 0.09 inches to about 1.2 inches and the outer core layer has a thickness about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. For example, when part of a three-piece ball or multi-layer ball according to invention, the intermediate layer and/or inner cover layer may have a thickness ranging from about 0.015 inches to about 0.06 inches. In another embodiment, the intermediate layer thickness is about 0.05 inches or less, more preferably about 0.01 inches to about 0.045 inches.

Hardness

Solid spheres formed of the compositions of the invention preferably have a hardness of about 30 to about 60 Shore D, more preferably about 35 to about 55 Shore D, and even more preferably about 40 to about 50 Shore D. For example, in one embodiment, a solid sphere formed of the composition of the invention has a hardness ranging from about 42 to about 50 Shore D.

As such, golf ball layers formed of the compositions also preferably have hardnesses in this range. For example, a golf ball layer formed of the composition of the invention may have a hardness less than about 60 Shore D. In one embodiment, the hardness is about 50 Shore D or less. In another embodiment, the hardness ranges from about 35 Shore D to about 50 Shore D, preferably from about 40 Shore D to about 50 Shore D. Because the compositions of the invention may be used in any layer of a golf ball, the golf ball construction, physical properties, and resulting performance may vary greatly depending on the layer(s) of the ball that include the compositions of the invention.

The cores included in golf balls of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D. For example, when a core is formed from the composition of the invention, the core may have a hardness of about 40 Shore to about 50 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. For example, when an intermediate layer is formed from the compositions of the invention, the hardness of the intermediate layer may be about 50 Shore D or less, preferably ranging from about 35 Shore D to about 50 Shore D. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater. For example, a golf ball of the invention may include an inner cover formed from a rosin-modified polymeric composition of the invention having a hardness of about 60 Shore D to about 75 Shore D.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 60 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

Compression

Compression values are dependent on the diameter of the component being measured. The Atti compression of the core, or portion of the core, of golf balls prepared according to the invention may range from about 30 to about 110 atti, preferably about 50 to about 100 atti. In one embodiment, the core compression is less than about 80, preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 50 to 100. In yet another embodiment, the compression of the golf balls of the invention is about 75 or greater and about 95 or less. For example, a preferred golf ball of the invention may have a compression from about 80 to about 95.

Coefficient of Restitution

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Solid spheres (1.55 inches) formed of the compositions of the invention may have a COR of at least about 0.820, preferably at least about 0.830. For example, the COR of solid spheres formed from the compositions of the invention ranges from about 0.840 to about 0.860. In one embodiment, a solid sphere formed from the composition of the invention has a COR of about 0.845 to about 0.855. In another embodiment, the COR of the solid sphere ranges from about 0.851 to about 0.856.

Alternatively, the maximum COR of the ball is one that does not cause the golf ball to exceed initial velocity requirements established by regulating entities such as the USGA. As used herein, the term "coefficient of restitution" (CoR) is calculated by dividing the rebound velocity of the golf ball by the incoming velocity when a golf ball is shot out of an air cannon. The COR testing is conducted over a range of incoming velocities and determined at an inbound velocity of 125 ft/s. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

Spin Rate

A spin rate of a golf ball refers to the speed it spins on an axis while in flight, measured in revolutions per minute ("rpm"). Spin generates lift, and accordingly, spin rate directly influences how high the ball flies and how quickly it stops after landing. The golf balls disclosed herein can be tested to determine spin rate by initially establishing test conditions using suitable control golf balls and golf clubs. For example, a spin rate of a golf ball struck by a standard golf driver was obtained by using test conditions for a Titleist NXT Tour® golf ball that gives a ball speed of about 159 to about 161 miles/hour, a launch angle of about 9.0 degrees to about 10.0 degrees, and a spin rate of about 2900 rpm to about 3100 rpm. Thus, in one embodiment, the spin rate of a golf ball of the invention hit with a golf club driver under the same test conditions is between about 1200 rpm to about 4200 rpm. In a preferred embodiment, the spin rate of a golf ball hit with a golf club driver is between about 2000 rpm to about 4000 rpm, more preferably between about 2500 and 3900 rpm.

For an 8-iron ball spin test, a spin rate of a golf ball struck by a standard 8-iron club was obtained by using test conditions for a Titleist NXT Tour® golf ball that gives a ball speed of about 114 to about 116 miles/hour, a launch angle of about 18.5 to about 19.5 degrees and a spin rate of about 8350 rpm to about 8550 rpm. Thus, in one embodiment, the spin rate of a golf ball with an average, cleanly struck 8-iron shot is between 5500 rpm and 10,000 rpm. In preferred embodiment, the spin rate of a golf ball of the invention with an average, cleanly struck 8-iron shot under the same test conditions is between 7500 rpm and 9500 rpm, more preferably between about 7700 rpm and 9300 rpm.

For a full wedge ball spin test, a spin rate of a golf ball struck by a standard full wedge was obtained by using test conditions for a Titleist NXT Tour® golf ball that gives a ball speed of about 93 to about 95 miles/hour, a launch angle of about 24 to about 25 degrees and a spin rate of about 9650 rpm to about 9850 rpm. Thus, in one embodiment, the spin rate of a golf ball with an average, cleanly struck full wedge shot is between 8000 rpm and 12,000 rpm. In preferred embodiment, the spin rate of a golf ball of the invention with an average, cleanly struck full wedge shot under the same test conditions is between 8500 rpm and 11,500 rpm, more preferably between about 9000 rpm and 11,000 rpm.

For a half wedge ball spin test, a spin rate of a golf ball struck by a standard half wedge was obtained by using test conditions for a Titleist NXT Tour® golf ball that gives a ball speed of about 52 to about 54 miles/hour, a launch angle of about 32 to about 34 degrees and a spin rate of about 5500 rpm to about 7500 rpm. Thus, in one embodiment, the spin rate of a golf ball with an average, cleanly struck half wedge shot is between 5000 rpm and 10,000 rpm. In preferred embodiment, the spin rate of a golf ball of the invention with an average, cleanly struck half wedge shot under the same test conditions is between 6200 rpm and 8,500 rpm, more preferably between about 6500 rpm and 8000 rpm.

Moisture Vapor Transmission

The moisture vapor transmission of a golf ball portion formed from the compositions of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate which balls have better water resistance. In one embodiment, the golf ball portions of the invention have a weight gain of about 15 grams per 100 in$^2$ per day or less at 38° C. and 90 percent relative humidity. In another embodiment, the golf balls of the invention have a weight gain of about 12.5 grams per 100 in$^2$ per day or less. In still another embodiment, the weight gain of the golf balls of the invention is about 7 grams per 100 in$^2$ per day or less. In yet another embodiment, the weight gain is about 5 grams per 100 in$^2$ per day or less. The golf balls of the invention preferably have a weight gain of about 3 grams per 100 in$^2$ per day or less.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

EXAMPLES

The following examples are only representative of the methods and materials for use in golf ball compositions and golf balls of this invention, and are not to be construed as limiting the scope of the invention in any way. All formulations are provided in weight percent of the total composition.

Example 1

Compositions of the Invention Including Modified HNPs

Compositions of the invention were formulated as shown below in Table 1 and tested for moisture content, melt flow index, and performance on flex bars to determine the flexural modulus and hardness values of the composition as shown in Table 2. The base ionomer is HPF 2000 from DuPont, which is a commercially available E/X/Y material presumably produced using a salt of fatty acid, such as magnesium stearate or magnesium oleate, in the presence of a suitable amount of magnesium counter ion and having a neutralization level of greater than 70 percent.

The compositions of the invention (Examples 1-3) are a modification of the HPF 2000 with various amounts of flow modifier ranging from 25 pph to 75 pph blended in a twin-screw extruder.

TABLE 1

Formulations of the Invention

| Formulation | HPF 2000 (pph) | Flow Modifier (pph) | |
|---|---|---|---|
| #1 | 100 | Zinc | 75 |
| #2 | 100 | Stearate | 50 |
| #3 | 100 | | 25 |
| Control | 100 | | — |

Flexural modulus values were tested under ASTM D6272-02.

TABLE 2

Performance on Flex Bars

| | #1 | #2 | #3 | Control |
|---|---|---|---|---|
| Moisture Content from Twin-Screw (ppm) | 1624 | 818 | 1193 | |
| Moisture Content (dried) (ppm) | 582 | — | — | |
| Melt Flow Index (g/10 min at 190°0 C./2160 g) | 19.2 | 10.3 | 3.8 | 1.3 |
| Flexural Modulus (2 weeks (psi)) | 29.5 | 23.3 | 15.1 | 13.0 |
| Hardness (Shore D/C) | 47/83 | 46/80 | 44/77 | 45/77 |

As can be seen in Table 2, the melt flow index (MFI) of the compositions of the invention is improved over the control. In fact, the addition of 25 pph flow modifier results in a MFI of more than double the MFI of the control. As the amount of flow modifier increases, the MFI also increases.

Likewise, the flexural modulus is increased in the modified HNPs of the invention over that of the control. In one embodiment of the invention (Example 1), the flexural modulus is more than doubled over that of the control.

The compositions of the invention and control were molded into 1.55 inch solid spheres and tested for compression, COR, and hardness. The results at 1 week and 2 weeks are shown in Table 3. None of the examples or control had voids.

TABLE 3

Performance on Solid Spheres

| | #1 | #2 | #3 | Control |
|---|---|---|---|---|
| | 1 week data | | | |
| Nameplate (inches) | 1.556 | 1.557 | 1.558 | 1.559 |
| Equator (inches) | 1.554 | 1.554 | 1.558 | 1.560 |
| Compression (atti) | 118 | 92 | 88 | 84 |
| Weight (oz.) | 1.128 | 1.120 | 1.110 | 1.092 |
| COR (125 ft/s) | 0.851 | 0.850 | 0.855 | 0.857 |
| | 2 week data | | | |
| Nameplate (inches) | 1.556 | 1.557 | 1.558 | 1.559 |
| Equator (inches) | 1.554 | 1.556 | 1.558 | 1.560 |
| Compression (atti) | 120 | 105 | 89 | 86 |
| Weight (oz.) | 1.128 | 1.120 | 1.110 | 1.092 |
| COR (125 ft/s) | 0.852 | 0.853 | 0.855 | 0.856 |
| Hardness (Shore D/C) | 48/82 | 48/80 | 45/77 | 47/77 |

When formed into solid spheres, the solid spheres formed with the compositions of the invention had higher compression than the solid sphere formed of the control. The COR of the invention spheres were slightly lower than the non-modified HNP control with more of a decrease as the level of flow modifier increased. The hardness of the invention spheres was slightly higher than the control with greater hardness gains as the amount of flow modifier increased.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("Mn") or weight average molecular weight ("Mw"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising:
a core having a diameter of about 1.50 inches to about 1.62 inches and a compression of about 120 atti or less formed of a composition comprising:
a copolymer of ethylene and an α, β-unsaturated carboxylic acid, wherein greater than about 70 percent of the acid groups in the copolymer are neutralized with a cation; and
a flow modifier present in an amount of 50 parts per hundred to 75 parts per hundred based on a hundred parts of the copolymer, wherein the flow modifier comprises a fatty acid salt, wherein the composition has a melt flow index of at least 10.3 g/10 min or greater at 190° C. using a 2160 gram weight;
wherein the fatty acid salt comprises erucic acid, linoleic acid or dimerized derivatives thereof and a cation selected from the group consisting of barium, lithium, sodium, zinc, bismuth, chromium, cobalt, copper, potassium, strontium, titanium, tungsten, magnesium, cesium, iron, nickel, silver, aluminum, tin, and calcium; and
wherein the composition has a Shore D hardness of about 40 to about 48 and a flexural modulus of about 23,300 psi to about 29,500 psi;
a cover having a thickness of about 0.03 to about 0.09 inches.

2. The golf ball of claim 1, wherein the cover comprises a castable thermoset material or thermoplastic material.

3. The golf ball of claim 1, wherein the melt flow index is between 10.3 g/10 min and 19.2 g/10 min at 190° C. using a 2160 gram weight.

4. The golf ball of claim 3, wherein the flow modifier is present in an amount of 75 parts per hundred based on a hundred parts of the copolymer and, wherein the melt flow index is 19.2 g/10 min at 190° C. using a 2160 gram weight.

5. The golf ball of claim 1, wherein the cover comprises a castable reactive liquid polyurethane, polyurea, epoxy resin, or polyamide or a copolymer comprising urethane and urea segments.

6. The golf ball of claim 1, wherein the flow modifier is present in an amount of 75 parts per hundred based on a hundred parts of the copolymer.

7. The golf ball of claim 1, wherein the composition further comprises a softening comonomer comprising alkyl acrylate.

8. The golf ball of claim 1, wherein the composition has a Shore D hardness of about 46 to about 47.

9. A golf ball comprising:
a core having a diameter of about 1.50 inches to about 1.60 inches;
an intermediate layer having a thickness of about 0.015 inches to about 0.06 inches; and
a cover having a thickness of about 0.02 to about 0.045 inches, wherein at least one layer in the golf ball is formed from a composition comprising:
a copolymer of ethylene and an α, β-unsaturated carboxylic acid, wherein greater than about 70 percent of the acid groups in the copolymer are neutralized with a cation; and
a flow modifier present in an amount of 75 parts per hundred based on a hundred parts of the copolymer, wherein the flow modifier comprises a fatty acid salt;
wherein the fatty acid salt comprises erucic acid, linoleic acid or dimerized derivatives thereof and a cation selected from the group consisting of barium, lithium, sodium, zinc, bismuth, chromium, cobalt, copper, potassium, strontium, titanium, tungsten, magnesium, cesium, iron, nickel, silver, aluminum, tin, and calcium;
wherein the composition has a Shore D hardness of about 40 to about 48 and a flexural modulus of about 23,300 psi to about 29,500 psi.

10. The golf ball of claim 9, wherein about 80 percent or greater of the acid groups in the copolymer are neutralized with a cation.

11. The golf ball of claim 10, wherein the cation source is selected from a group consisting of metal cations of lithium, sodium, potassium, magnesium, calcium, barium, lead, tin, zinc, or aluminum.

12. The golf ball of claim 9, wherein the intermediate layer is formed from the composition.

13. The golf ball of claim 9, wherein the core is formed from the composition.

14. The golf ball of claim 9, wherein the composition has a Shore D hardness of about 46 to about 47.

15. A golf ball comprising:
a core having a diameter of about 0.5 inches to about 1.30 inches;
an outer core layer having a thickness of about 0.125 inches to about 0.5 inches;
an inner cover layer disposed about the outer core layer having a thickness of about 0.015 inches to about 0.06 inches; and
an outer cover layer disposed about the inner cover layer having a thickness of about 0.02 to about 0.045 inches, wherein the golf ball has a compression of about 50 to about 100 atti and a coefficient of restitution of at least about 0.805 at 125 ft/sec, and wherein at least one layer in the golf ball is formed from a composition comprising:
a copolymer of ethylene, an $\alpha$, $\beta$-unsaturated carboxylic acid, and an optional comonomer, wherein greater than about 70 percent of the acid groups in the copolymer are neutralized with a cation; and
a flow modifier comprising a fatty acid salt, wherein the composition has a melt flow index of at least 10.3 g/10 min at 190° C. using a 2160 gram weight, wherein the composition has a flexural modulus of about 23,300 psi to about 29,500 psi, and wherein the composition has a Shore D hardness of about 40 to about 48;
wherein the fatty acid salt comprises erucic acid, linoleic acid or dimerized derivatives thereof and a cation selected from the group consisting of barium, lithium, sodium, zinc, bismuth, chromium, cobalt, copper, potassium, strontium, titanium, tungsten, magnesium, cesium, iron, nickel, silver, aluminum, tin, and calcium.

16. The golf ball of claim 15, wherein the comonomer is present in an amount of about 0 percent to 10 percent by weight of the copolymer.

17. The golf ball of claim 15, wherein about 90 percent or greater of the acid groups in the copolymer are neutralized with a cation.

18. The golf ball of claim 17, wherein about 100 percent or greater of the acid groups in the copolymer are neutralized with a cation.

19. The golf ball of claim 15, wherein the core comprises the composition.

20. The golf ball of claim 15, wherein the outer core layer comprises the composition.

21. The golf ball of claim 15, wherein the composition has a Shore D hardness of about 46 to about 47.

* * * * *